Feb. 5, 1946.  H. G. ALLEN ET AL  2,394,420
ADHESIVE HANDLING DEVICE
Filed Jan. 1, 1944  4 Sheets-Sheet 1

INVENTORS
Howard G. Allen and
Elden R. Kenison
BY James D. Bock
ATTORNEY

Feb. 5, 1946.     H. G. ALLEN ET AL     2,394,420
ADHESIVE HANDLING DEVICE
Filed Jan. 1, 1944     4 Sheets-Sheet 3

INVENTORS
Howard G. Allen and
Elden R. Kenison
BY James D. Bock
ATTORNEY

Feb. 5, 1946.   H. G. ALLEN ET AL   2,394,420
ADHESIVE HANDLING DEVICE
Filed Jan. 1, 1944   4 Sheets-Sheet 4

INVENTORS
Howard G. Allen and
Elden R. Kenison
BY James D. Bock
ATTORNEY

Patented Feb. 5, 1946

2,394,420

UNITED STATES PATENT OFFICE 2,394,420

ADHESIVE HANDLING DEVICE

Howard G. Allen, Niagara Falls, and Elden R. Kenison, Kenmore, N. Y., assignors to Consolidated Packaging Machinery Corporation, Buffalo, N. Y., a corporation of New York Application January 1, 1944, Serial No. 516,722

9 Claims. (Cl. 91—47)

The present invention relates to an adhesive-applying device and more particularly to the adhesive-supply portion of such a device. The present invention is adaptable to many uses in which the supply of a uniform film of adhesive of controllable predetermined thickness is necessary or desirable. Thus the invention is applicable to packaging machines and to machines in which articles of manufacture are assembled by the use of adhesive.

It is an object of the present invention to provide means for supplying in a position to be transferred to an article a film of adhesive of uniform thickness.

It is a further object of this invention to provide means for supplying such a uniform film of adhesive and to provide for control of the thickness of such film whereby a uniform film of substantially any desired thickness may be supplied.

It is a further object of the present invention to provide apparatus in accordance with the objects above stated, which apparatus is simple to manufacture and maintain in operation and which is unlikely to need repair.

It is a further object to provide in such apparatus a simple and effective means for establishing a desired, predetermined thickness of adhesive film in which a relatively broad range of adjustment is provided.

It is a further object of the present invention to provide an adhesive transfer device which is operative to transfer from a supplying means to a series of objects adhesive in a film of definitely controlled thickness.

It is a further object of the present invention to provide an adhesive-applying machine comprising apparatus for forming a highly uniform film of adhesive and apparatus especially designed to transfer accurately predetermined portions of such film to a series of objects.

Other and further objects of the present invention will become apparent upon consideration of the following detailed description of preferred but not necessarily the only forms of such invention, taken in connection with the drawings accompanying and forming a part of this specification.

In the drawings.

In each of the sectional views the section is taken in the direction of the arrows associated with the section lines. Similar characters of reference are used to indicate similar parts throughout the several views.

In the embodiment of the invention illustrated in Figs. 1 through 7 the adhesive-supplying device and the adhesive transfer device are shown in an apparatus in which exceedingly uniform films of adhesive must be applied to objects successively presented at an operating station by means of an indexing table 10 carried by a drive shaft 10a. No details of the indexing table 10 have been illustrated herein inasmuch as it will be understood that such table may be generally circular in formation and may be provided with suitable seats in which are individually positioned a plurality of objects. Suitable mechanism is provided for periodically rotating the shaft 10a and moving the indexing table 10 a proper angular distance to bring successive objects carried thereon into position for operation of the adhesive-applying station herein illustrated and for operation of such other stations as may be included in the machine. It is contemplated that as each object arrives in a station the indexing table will stop and the object will be permitted to remain stationery for a length of time sufficient for simultaneous operation of the various stations.

In the machine chosen for illustration objects 9 have been positioned upon the table 10 as aforesaid. It is desired to apply to each of these objects a very carefully controlled quantity of adhesive covering a definite area and of a predetermined thickness. Thus in order to insure that the adhesive is applied to successive objects in substantially perfectly uniform thickness it is necessary to provide an apparatus for supplying to the transfer mechanism a film of adhesive of as nearly perfect uniformity as possible. To this end the apparatus of the present invention has been devised.

Figure 1:
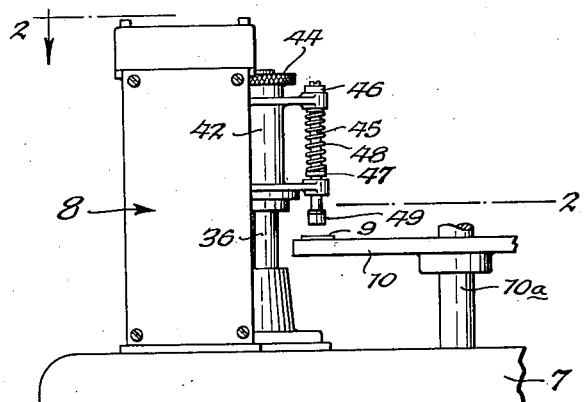
Fig. 1 is a partial side elevational view of a machine embodying the present invention and adapted for operation upon objects of one general type.
Figure 2:
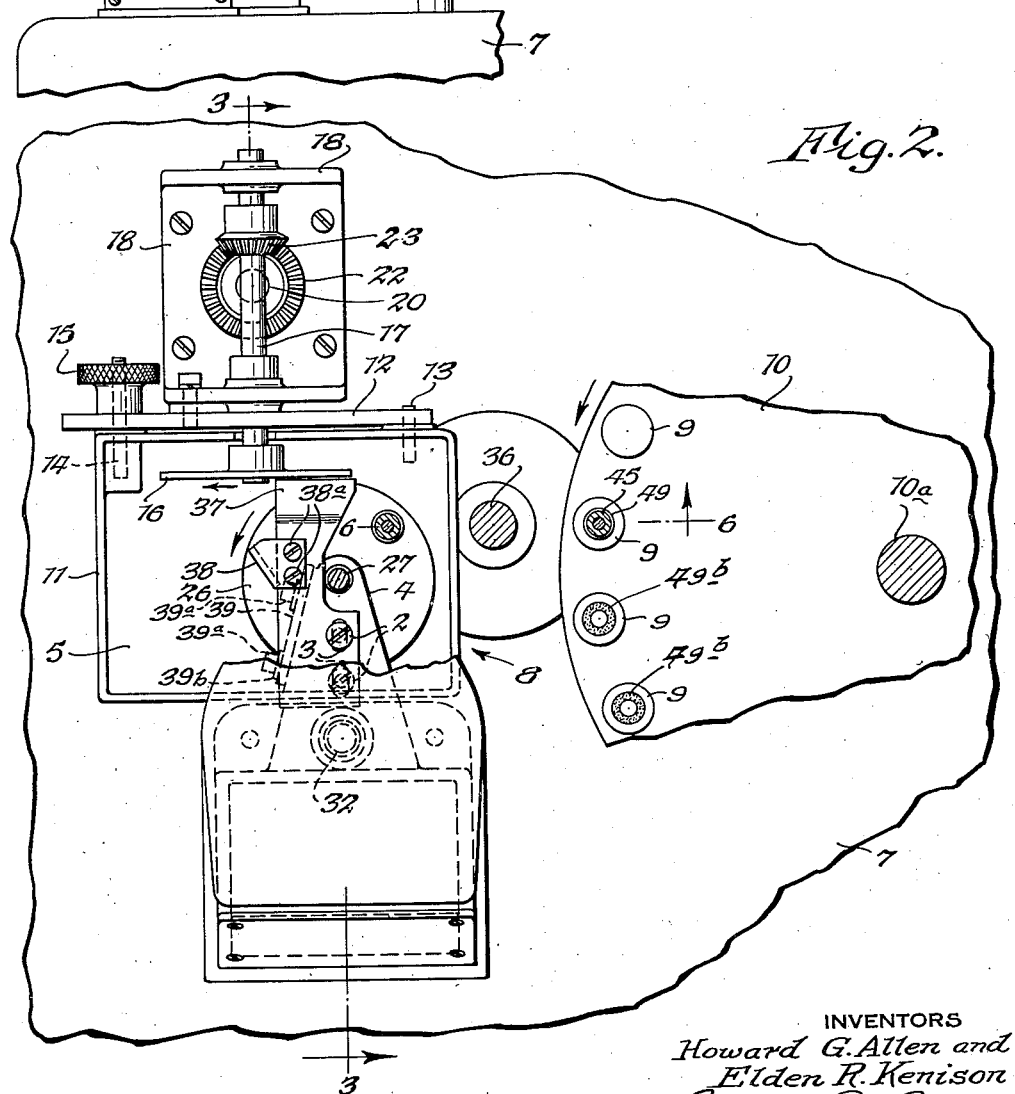
Fig. 2 is an enlarged plan view of the portion of the machine in Fig. 1 and it comprises in part a section along the line 2—2 in Fig. 1.

As shown in Fig. 1 the apparatus of the present invention may be mounted upon a base 7 upon which is carried the adhesive-applying station generally indicated at 8. Within the station 8 is an adhesive carrying pan 11 provided with a suitable cover 6 (see Fig. 3). As shown in Fig. 2 the cover 6 has been removed in order to reveal the mechanism located within the adhesive pan 11. The adhesive pan 11 may be detachably secured to a strap 12 by means of a pin 13 and a threaded stud 14 secured to the pan 11 and slidably received in suitable openings in the strap 12. The stud 14 is adapted to receive a knurled knob 15 for temporarily securing the pan in position. The strap 12 is supported by a bracket 18 carried by the base 7 of the machine (see Fig. 3).

The apparatus to be described herein is suitable for use with any of the known types of fluid adhesives including so-called "hot melts" as well as those adhesives whose viscosity is lowered by application of heat and those adhesives which contain volatile solvents. In the event a heat sensitive adhesive is used it will be understood that suitable heating apparatus will be associated with the pan 11 and other parts described herein.

Figure 3:
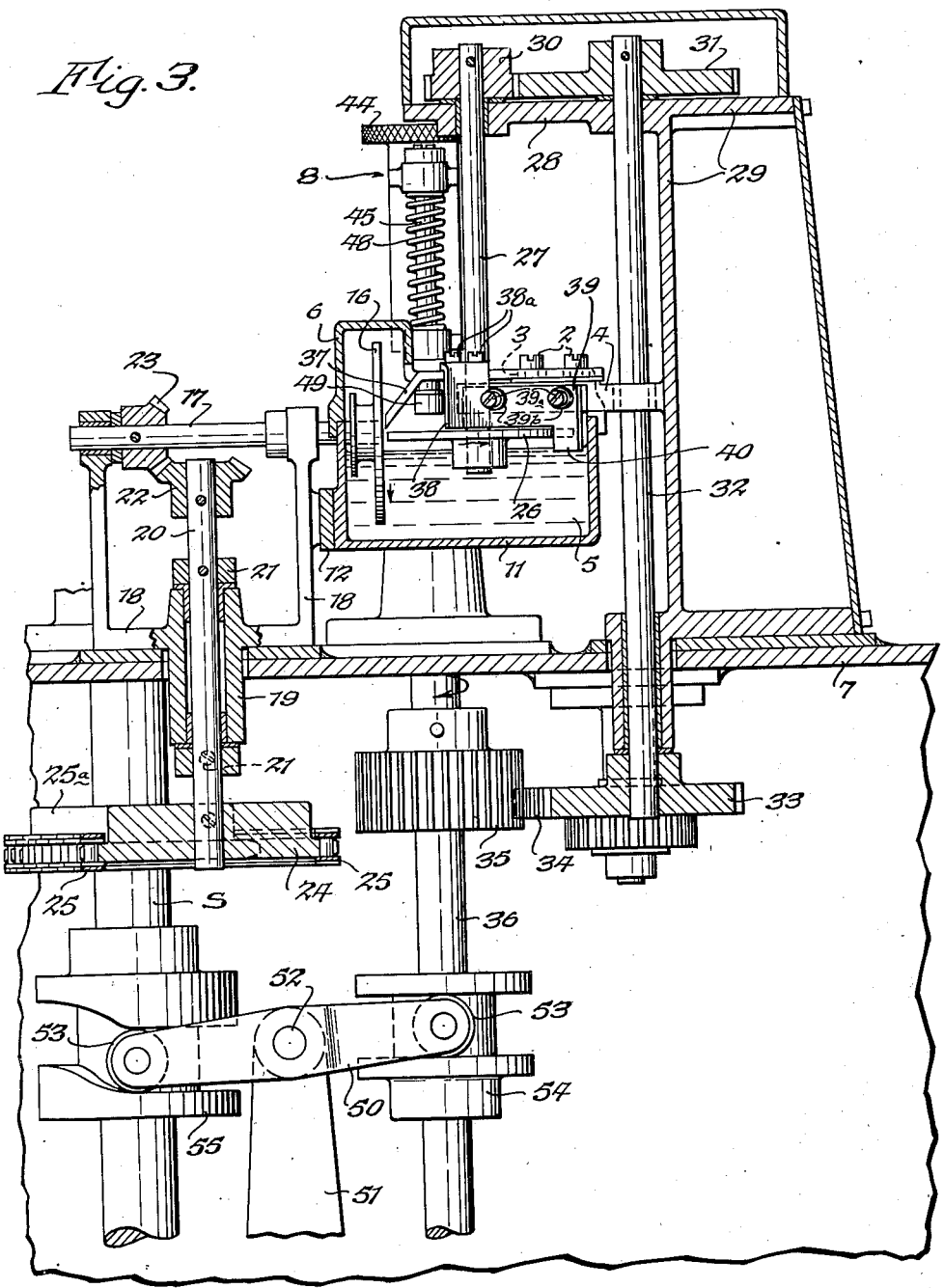
Fig. 3 is a vertical section on line 3—3 of Fig. 2.

As shown in Figs. 2 and 3 an adhesive-supply disc 16 is located within the adhesive pan 11 in such position as to rotate about a horizontal axis with a substantial portion of the surface thereof immersed in a supply of adhesive 5 carried within the pan 11. To this end the disc 16 is secured to a horizontal shaft 17 which projects outside the pan 11 and is carried in suitable journal bearings formed upon the bracket 18.

A vertical shaft 20 is rotatably carried in a journal bearing 19 formed in the bracket 18 and is secured in position by set collars 21, 21 located respectively above and below the bearing 19. At its upper end the vertical shaft 20 has secured thereto a beveled pinion 22 which meshes with a similar beveled pinion 23 secured to the shaft 17. At its lower end the vertical shaft 20 carries a sprocket 24 about which is conducted a chain 25. The chain 25 is also conducted about a suitable sprocket 25a secured to a vertical drive shaft S. The shaft S may comprise the main drive shaft of the machine with which the adhesive-applying device of the present invention is associated. It will be understood that the shaft S will be driven for rotation by any suitable source of power (not shown) and that it will be interconnected with the shaft 10a and a shaft 36, to be described hereinbelow, through suitable intermittent driving mechanism (not shown). The rotation of the shaft S is therefore transmitted through the chain 25, vertical shaft 20 and pinions 22, 23 to the horizontal shaft 17 whereby the adhesive supply disc 16 is caused to rotate. The driving mechanism just described is so arranged with regard to the direction of rotation of the main shaft S that the disc 16 rotates in a counterclockwise direction as viewed in Fig. 2 and is indicated by the arrows in Figs. 2 and 3.

An adhesive film-forming and carrying table or disc 26 is located within the pan 11 and is so mounted as to rotate about a vertical axis whereby the upper face of the table or disc will be disposed in a substantially horizontal plane. Referring now to Fig. 3, the disc 26 is secured to the lower end of a vertical shaft 27 which is rotatable within a journal bearing formed in an arm 28 of a bracket 29 carried by the base 7 of the machine. At its upper end the shaft 27 has secured thereto a pinion 30 which meshes with a pinion 31 secured to the upper end of a vertical shaft 32. The shaft 32 extends downwardly into the interior of the base 7 and carries adjacent its lower end a pinion 33 which meshes with an idler pinion 34 which in turn meshes with a pinion 35. The pinion 35 is secured to a shaft 36 which is driven from the main drive shaft S through any suitable form of intermittent driving mechanism (not shown) for successive rotation of 180° upon each indexing of the table 10. The latter mechanism as well as the indexing mechanism for the table 10 has not been shown herein inasmuch as any suitable form of such mechanism may be employed. For a purpose to be described in detail hereinafter the pinion 35 is substantially wider than the idler 34 with which it meshes in order to permit continuous meshing during certain vertical movements of the shaft 36.

Figure 4:
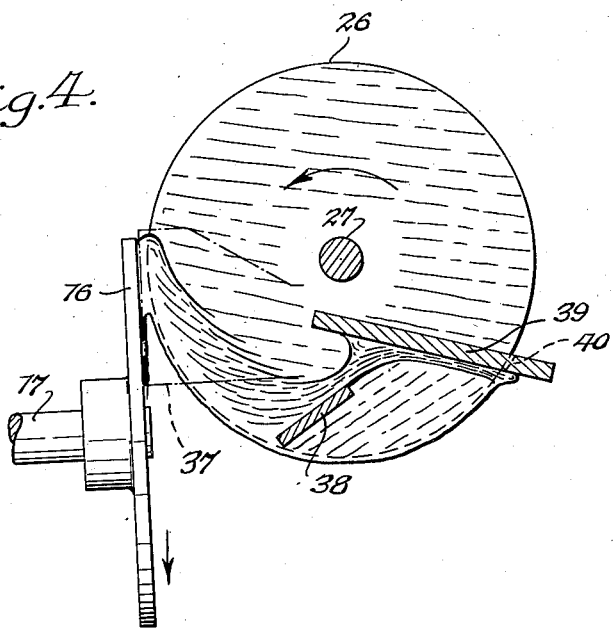
Figs. 4 and 5 are somewhat diagrammatic views illustrating the manner in which a film of adhesive is formed.
Figure 5:
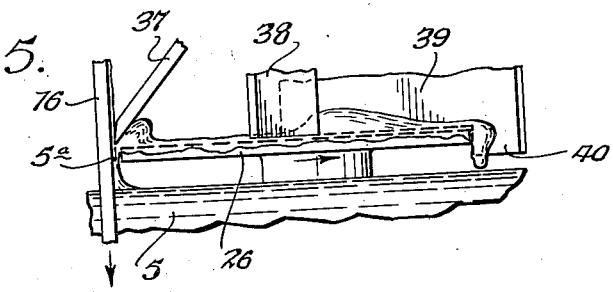

The mechanism for forming a film of adhesive upon the disc 26 will now be described. Referring first to Figs. 4 and 5, it will be observed that this mechanism comprises an adhesive-removing blade 37 located in proximity to the adhesive-bearing surface of the supply disc 16 in such position as to remove adhesive from the surface of the disc 16 and direct it downwardly upon the upper face of the disc 26 in an area adjacent the periphery thereof. An equalizing blade 38 is mounted above and spaced from the disc 26 and is so disposed as to direct a portion of the adhesive radially inwardly of the disc 26 in order to provide a rough distribution of adhesive across the entire face of the disc. A film-measuring blade 39 is also mounted above the face of the disc 26 in a position with regard to rotation of the disc beyond that of the equalizing blade 38. The layer of adhesive deposited by the blade 37 and roughly equalized by the blade 38 is finally formed into an accurately distributed film of desired thickness by the blade 39. The blade 39 is so disposed as to direct excess adhesive outwardly radially of the disc 26 whereby such excess is permitted to flow off the edge of the disc into the supply 5. A heel 40 is preferably formed upon the blade 39 and is so located relative to the periphery of the disc 26 as to remove substantially all of the adhesive from such periphery. The blades 37 and 39 are each mounted for adjustment for optimum operation in connection with the forming of a film of chosen thickness. The final thickness of the film is determined by vertical adjustment of the blade 39 relative to the face of the disc 26. The blade 37 may be moved toward and from the disc 16 to vary the amount of adhesive removed from the disc 16 in accordance with the demand established by the desired thickness of film. The blade 38 may also be mounted for adjustment but it will be understood that adjustment thereof is not of critical importance.

Referring particularly to Figs. 2 and 3 it will be observed that the blades 37, 38 and 39 are supported by an arm 4 similar to the arm 28 and carried by the bracket 29. The arm 4 may be perforated to receive a bearing bushing for the shaft 27 and to allow clearance for the passage of the vertical shaft 32. The blade 37 may be formed from sheet metal or other suitable material and as shown in Fig. 2 is provided with elongated openings 3 through which screws 2 may extend into threaded engagement with the arm 4. The construction just described provides for lengthwise adjustment of the blade 37 toward and from the vertical face of the disc 16.

The equalizer blade 38 may also be made of sheet material and may be secured as by screws 38a to the blade 37. As stated above, vertical adjustment of the blade 38 relative to disc 26 is not of critical importance. However, it may be accomplished by placing shims (not shown) of desired thickness between the horizontal portion of the blade 38 and the blade 37. In the construction shown the blade 38 partakes of the lengthwise movement of the blade 37 during adjustment thereof. Such movement of the blade 38 is of no consequence and occurs merely as a result of securing the blade to the most convenient adjacent element.

The film-forming blade 39 may be secured to the arm 4 by means of screws 39a. The screws 39a have positioned upon them and between the heads thereof and the body of the blade 39 washers 39b. The body of the blade 39 has formed therein (not shown) openings considerably larger in diameter than the diameter of the body of the screws 39a. The washers 39b are larger in diameter than the openings in the blade 39 whereby the blade 39 may be moved universally relative to the screws 39a within the limits of difference in diameter between the body of the screws 39a and the enlarged openings aforesaid. This construction provides for exceedingly fine adjustment of the level of the lower edge of the blade 39 relative to the level of the upper face of the disc 26. By proper adjustment of the blade 39 an adhesive film of uniform thickness may be formed throughout substantially the entire width of the disc 26. The universal movement of the blade 39 may also be availed of to bring the heel 40 formed thereon into proper proximity to the vertical edge of the disc 26 whereby to remove from such edge the adhesive discharged thereover by the blade 39.

The operation of the above-described film-forming apparatus will now be set forth with particular regard to Figs. 4 and 5. In Fig. 5 it will be observed that a layer of adhesive 5a is carried upwardly from the supply 5 by the disc 16. The blade 37 is adjusted into close proximity with the surface of the disc 16 whereby to remove a portion of the layer 5a from the disc 16. The portion thus removed will lie on the underside of the blade 37 and accordingly will be directed downwardly upon the upper face of the disc or table 26 and will form a bead lying adjacent the outer boundary of the upper face of the disc. Rotation of the disc 26 will carry this bead of adhesive into contact with the equalizer blade 38 as shown in Fig. 4 and the blade 38 will direct a portion of the bead of adhesive inwardly radially of the disc. This inwardly directed portion and the portion which flows beneath the blade 38 will therefore be brought in a fairly even distribution into contact with the film-forming blade 39. The portion of the adhesive which is permitted to flow beneath the blade 39 will be formed into a flat, evenly distributed film extending across the zone of the disc 26 lying to the right of the vertical shaft 27. As stated above, such excess of adhesive as might be brought into contact with the blade 39 will be directed outwardly radially of the disc and will discharge over the vertical edge from which it is cleaned by the action of the heel 40.

The apparatus just described thus operates to supply an extremely accurate film of adhesive which is disposed in a generally horizontal position and which may extend over any suitable area determined by the dimensions of the disc 26. A suitable portion of this film of adhesive may be transferred to the work by any desired form of apparatus. Preferably such transfer apparatus is so designed as to take full advantage of the accuracy of film formation herein provided.

In general a transfer apparatus suitable for use with the film-forming mechanism just described should avoid relative movement between the film forming disc 26 and the transfer element during the time that such element is in contact with the disc 26 or the film of adhesive thereon. Thus if the disc 26 is to rotate continuously the transfer element should move in complete synchronism therewith during such contact. Alternately the disc 26 may be brought to rest and the transfer element may be moved into and out of contact therewith in such a manner as to avoid any sliding movement in the plane of the film of adhesive. Two illustrative forms of transfer apparatus of the latter type are disclosed herein.

As pointed out above, the vertical shaft 36 is an intermittently rotating shaft which moves through 180° upon each indexing of the index table 10. Inasmuch as the film-forming and carrying disc 26 is driven from the shaft 36 it will be apparent that the disc 26 will move and will come to rest simultaneously with the shaft 36.

Figure 6:
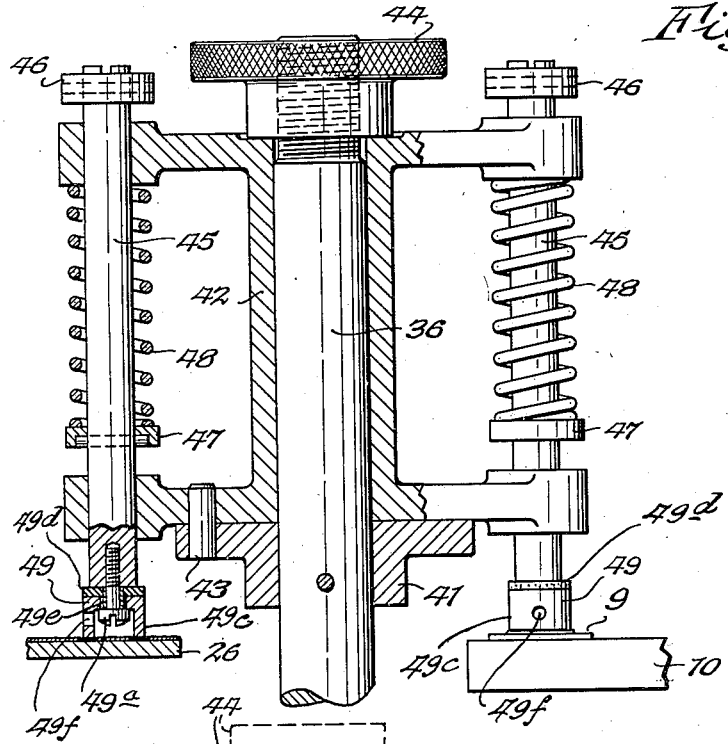
Fig. 6 is an enlarged detailed view of the form of applicator device shown in Fig. 1.
Figure 7:
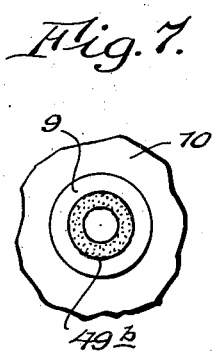
Fig. 7 is a plan view showing an object to which a film of adhesive has been applied by the apparatus shown in Figs. 1 through 6.

Referring now to Fig. 6, the upper portion of the shaft 36 has secured thereto a flanged hub 41 upon which rests a bracket 42. The bracket 42 is internally bored whereby to slide freely upon the shaft 36. A pin 43 is secured to the flange of the hub 41 and a suitable opening is provided in a portion of the bracket 42 for the reception of the pin 43. The bracket 42 may thus be slipped upon the upper end of the shaft 36 and engaged through the pin 43 with the hub 41 for rotation therewith. The upper end of the shaft 36 may be threaded to receive a hand knob 44 which may be threaded upon the shaft 36 to secure the bracket 42 in its operative position. The bracket 42 is formed with two pairs of radially extending arms which provide upper and lower slidable bearings within which are received plungers 45. At the upper end of each of the plungers 45 there may be provided a collar 46 for the purpose of limiting downward movement of the plungers within the bearings in the bracket 42. In a position between the upper and lower bearings each of the plungers 45 is provided with a collar 47 secured to the respective plunger 45 to provide a seat for an expansive spring 48. The upper end of each of the expansive springs 48 bears against the lower portion of the upper bearing. The construction just described provides for yieldable urging of each of the plungers 45 in a downward direction within the limits of movement thereof established by the limit collars 46.

At the lower end of each of the plungers 45 there is provided an adhesive-applying head 49. In the modification shown in Figs. 1 through 7 the heads 49 are small, cylindrical bodies. These heads or bodies 49 are preferably made to permit them to have a limited yielding action whereby the bodies may set or adjust themselves squarely upon the face of the disc 26 or upon any object 9. Thus the ends of the heads 49 may pick up from the disc 26 uniform spots or sections of adhesive for transfer to the objects 9 on the indexing table 10.

Each head 49 (see Fig. 3) therefore includes a substantially cup-like, rigid member 49c, the flat, closed end of which bears against a rubber or other yielding washer 49d. This washer is interposed between the member 49c and the lower end of the plunger 45 to which the head is to be attached. The base of each cup is bored for the reception of the shank of a cap screw 49a which is threaded into the end of the plunger 45. The head of the screw 49a is disposed within the cup-like member 49c and bears against the outer end of a metal sleeve 49e surrounding the shank of the screw. The other end of the sleeve engages the adjacent end of the plunger 45. The sleeve 49e is of such length as to allow the member 49c to tilt or rock slightly about the screw head, whereby the head 49, when engaging the disc 26 or an object 9, can automatically set itself squarely thereon. The rubber washer 49d will, of course, yield when such action occurs.

The shape of the member 49c is such as to present a ringlike face which serves as the adhesive-transfer surface. This particular form of adhesive-applying head 49 thus applies a ring of adhesive such as is shown at 49b in Figs. 2 and 7.

If desired a hole 49f may be formed in the side wall of each head 49, see Fig. 3, by which to avoid suction between the head 49 and the disc 26 and which might cause too much glue to adhere to the head 49. This arrangement will also prevent any tendency of the heads 49 to lift or disturb the objects 9 on the index head 10.

As shown in Fig. 3 the shaft 36 is provided with means for vertically reciprocating the shaft in timed relation with the rotation thereof. This means includes a rocking arm 50 pivotally mounted upon a stationary post 51 by means of a suitable pivot pin 52. Each end of the arm 50 is provided with an anti-friction roller 53. One end of the arm 50 is bifurcated and actually carries two anti-friction rollers 53, only one of which is shown. The bifurcated end of the arm 50 engages a double flanged hub 54 fixed upon the shaft 36. The flanges upon the hub 54 are so spaced as closely to confine the rollers 53 and to translate rocking motion of the arm 50 into linear movement of the shaft 36. At its other end the arm 50 engages a barrel cam 55 fixed upon the main drive shaft S. The cam track of the cam 55 is so contoured as to rock the arm 50 to impart to the shaft 36 an upward and a downward movement during each rotation of the shaft 36 through 180°. These upward and downward movements are so timed that a downward movement is completed after the shaft 36 ceases rotation and an upward movement is initiated before rotation of the shaft 36 is resumed.

The construction just described provides for bringing the adhesive-applying heads 49 into their lowermost positions while the film-carrying disc 26 and the indexing table 10 are at rest, and it provides for disengagement of the adhesive-applying heads from the disc 26 and the object carried by the indexing table 10 before motion of either the disc or table is resumed. Preferably the ratio of the gears 33 and 35 which interconnect the shaft 36 and disc 26 is so selected that the disc 26 rotates somewhat more or somewhat less than 180° or through an angle which is not a multiple or definite fraction of 180° upon each 180° rotation of the shaft 36. Thus there may be presented to the transfer heads 49 a different portion of the disc 26 upon each operation of the machine.

From a comparison of Figs. 1 and 6 it will be apparent that downward motion of the shaft 36 will bring the adhesive-applying heads 49 into contact with the disc 26 and the object 9 upon the indexing table 10. Preferably the mechanism is so proportioned that the springs 48 will exert yieldable pressure between the adhesive-applying heads and the surfaces with which they engage. To this end the shaft 36 moves vertically downwardly from its Fig. 1 position to its Fig. 6 position a distance somewhat greater than that lying between the heads 49 and the disc or object located therebeneath when the mechanism is in its uppermost position as shown in Fig. 1.

In operation the transfer mechanism just described is effective to bring one of the adhesive-applying heads 49 into engagement with the film of adhesive formed upon the disc 26 and the other head 49 into engagement with the object 9. When each cycle of operation is complete the shaft 36 moves upwardly and then rotates through 180° whereby to bring the head 49 which has just engaged the adhesive film into a position above the next succeeding object 9 on the indexing table 10. When rotation of the parts ceases the shaft 36 moves downwardly to bring the latter head into engagement with such object 9 while the other head is brought into engagement with a fresh portion of the film of adhesive upon disc 26.

Figure 8:
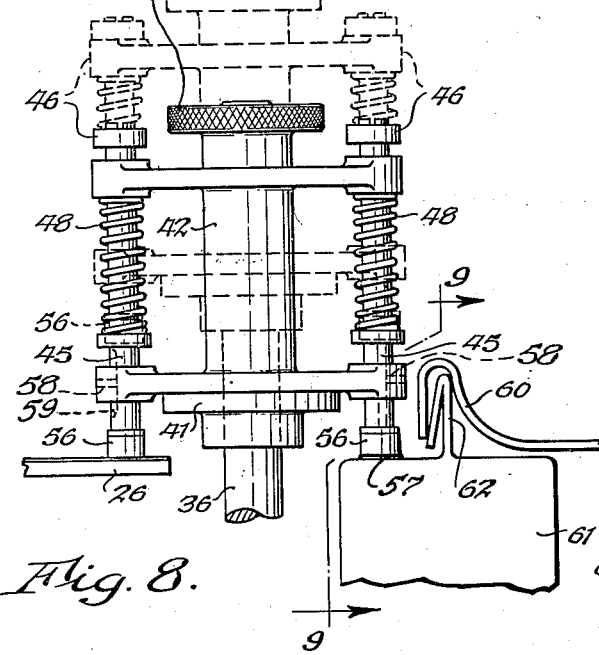
Fig. 8 is a view similar to Fig. 6 showing a modification of the applicator device, adapting the same for use in a packaging machine.
Figure 9:
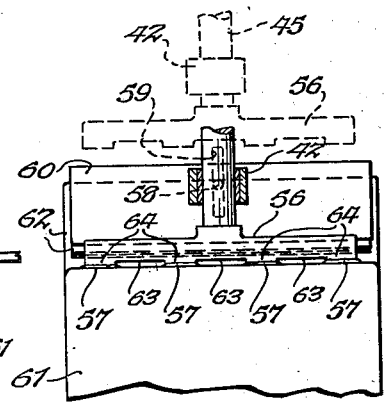
Fig. 9 is a sectional view taken along the line 9—9 of Fig. 8.

In the modification of the adhesive transfer device shown in Figs. 8 and 9 a mechanism has been provided for the transfer of adhesive from the disc 26 to an elongated object such as the shoulder of a filled paper bag. It is contemplated in this connection that the adhesive-supplying and adhesive-transfer device will be associated with a bag closing machine such as that shown in United States Patent No. 2,175,557, granted October 10, 1939, to R. N. Cundall. In this particular bag closing machine filled paper bags are closed by tucking in the gusseted side walls of the bag and collapsing the front and rear walls upon the side walls whereby to form a flattened neck which is bent over upon itself and which is thereafter bent downwardly into engagement with adhesive positioned on the shoulder of the bag above the level of the contents. The latter bending operation and pressing of the bag mouth into engagement with the adhesive is performed by a movable shoe such as shown at 60 in Fig. 8. For the purposes of the present disclosure the shoe 60 has been shown in proper association with a bag 61 whose mouth 62 is in condition to be folded down into engagement with adhesive. Bags 61 are successively presented at the adhesive-applying station by a suitable intermittently operable conveyor such as is shown in said Patent 2,175,557. Adaptation of the present invention to a bag-closing machine of the type discussed involves merely the provision of suitably shaped transfer heads. In Figs. 8 and 9 heads 56 of suitable shape have been shown. These heads comprise elongated bars of a width commensurate with that of the bags with which they are to operate. The heads 56 are secured to the lower ends of the plungers 45 in any suitable manner. In order to prevent rotation of the heads 56 out of proper position for engagement with the shoulders of bags successively presented thereto there may be provided an elongated, vertically disposed slot 59 in each of the plungers 45. Pins 58 are inserted through suitable openings in the bracket 42 to engage in the slots 59. This arrangement prevents rotation of the plungers 45 while permitting them to move vertically in the course of operation of the device.

Preferably the heads 56 are recessed as at 63 whereby to form a plurality of spaced adhesive-applying surfaces 64. When the head 56 is thus constructed it will apply a pattern of adhesive comprising a plurality of spaced spots 57 as indicated in Fig. 9. For certain types of adhesive it may be preferable to provide the heads 56 with different types of pattern-applying surfaces, and it is possible that with particular types of adhesive a continuous, rectangular pattern may be preferred.

The above detailed description of a preferred form of adhesive film-forming apparatus and preferred forms of adhesive transfer mechanism suitable for use therewith has been made in order to comply with the patent statutes. It will be understood that modifications and variations may be resorted to by those skilled in the art and that it is the intention to include such modifications and variations as are within the scope of the appended claims.

What is claimed is:

1. In a machine of the class described the combination with a container in which is positioned a supply of adhesive in fluid form; of a rotary table having a surface disposed substantially in a horizontal plane; means for transferring adhesive from said supply to said surface of said rotary table; equalizing means mounted in spaced relation with said surface of said table and constructed and arranged to spread said adhesive across a substantial portion of said surface; a member having an edge portion mounted in spaced relation with said surface of said table, said edge portion and said surface defining a film-forming passageway of predetermined dimensions; and means to rotate said table relative to said member to carry at least a portion of the adhesive positioned on said table through said film-forming passageway to form thereof a film of predetermined thickness.

2. In a machine of the class described the combination of a table having an adhesive-carrying surface; means to supply adhesive to said surface; equalizing means mounted in spaced relation with said surface of said table and constructed and arranged to spread said adhesive across a substantial portion of said surface; a member having an edge portion mounted in spaced relation with said surface of said table, said edge portion and said surface defining a film-forming passageway of predetermined dimensions; and means to move said table relative to said equalizing means and said member to successively spread said adhesive and form of at least a portion thereof a film of predetermined thickness.

3. In a machine of the class described the combination with a container in which is positioned a supply of adhesive in fluid form; of a first rotary table having a surface disposed substantially in a horizontal plane; a second rotary table having a surface disposed substantially in a vertical plane; means for mounting said second table in a position in which a portion of its said surface is immersed in said adhesive and another portion of its said surface is positioned in proximity with and substantially tangential to said first table; means to rotate said second table to elevate adhesive from said supply to a position above the plane of said surface of said first table; means to remove a portion of the adhesive from said second table and transfer it to said surface of said first table; equalizing means mounted in spaced relation with said surface of said first table and constructed and arranged to spread said adhesive across a substantial portion of said surface; a member having an edge portion mounted in spaced relation with said surface of said first table, said edge portion and said surface defining a film-forming passageway of predetermined dimensions; and means to rotate said first table relative to said equalizing means and said member to successively spread said adhesive and form of at least a portion thereof a film of predetermined thickness.

4. In a machine of the class described the combination with a container in which is positioned a supply of adhesive in fluid form; of a first rotary table having a surface disposed substantially in a horizontal plane; a second rotary table having a surface disposed substantially in a vertical plane; means for mounting said second table in a position in which a portion of its said surface is immersed in said adhesive and another portion of its said surface is positioned in proximity with and substantially tangential to said first table; means to rotate said second table to elevate adhesive from said supply to a position above the plane of said surface of said first table; a scraper mounted above said first table and having an edge extending into close proximity with the said surface of said second table, said scraper transferring a portion of the adhesive from said second table to said surface of said first table; equalizing means mounted in spaced relation with said surface of said first table and constructed and arranged to spread said adhesive across a substantial portion of said surface; a member having an edge portion mounted in spaced relation with said surface of said first table, said edge portion and said surface defining a film-forming passageway of predetermined dimensions; and means to rotate said first table relative to said equalizing means and said member to successively spread said adhesive and form of at least a portion thereof a film of predetermined thickness.

5. In a machine of the class described the combination with a container in which is positioned a supply of adhesive in fluid form; of a circular rotary table having a surface disposed substantially in a horizontal plane; means for transferring adhesive from said supply to a portion of said surface of said table adjacent the outer boundary thereof; a first blade having an edge portion spaced from and extending across said surface of said table from a point in proximity with the outer boundary of said table inwardly thereof, said blade being disposed at such an angle to a radius of said table as to spread said adhesive inwardly across a substantial portion of said surface upon rotation of said table; a second blade having an edge portion mounted in spaced relation with said surface of said table, said edge portion and said surface defining a film-forming passageway of predetermined dimensions; and means to rotate said table to carry the adhesive transferred thereto successively into contact with said first and second blades to form on a substantial portion of the surface of said table a film of adhesive of predetermined thickness.

6. In a machine of the class described the combination with a container in which is positioned a supply of adhesive in fluid form; of a circular rotary table having a surface disposed substantially in a horizontal plane; means for transferring adhesive from said supply to a portion of said surface of said table adjacent the outer boundary thereof; a first blade having an edge portion spaced from and extending across said surface of said table from a point in proximity with the outer boundary of said table inwardly thereof, said blade being disposed at such an angle to a radius of said table as to spread said adhesive inwardly across a substantial portion of said surface upon rotation of said table; a second blade having an edge portion mounted in spaced relation with said surface of said table, said edge portion and said surface defining a film-forming passageway of predetermined dimensions; and means to rotate said table to carry the adhesive transferred thereto into contact with said first blade for spreading thereof and into contact with said second blade whereupon a portion at least of said adhesive will be carried through said film-forming passageway to form on a substantial portion of the surface of said table a film of adhesive of predetermined thickness, said second blade being disposed at such an angle to a radius of said table as to direct outwardly thereof any portion of said adhesive in excess of that which passes through said film-forming passageway.

7. In a machine of the class described the combination with a container in which is positioned a supply of adhesive in fluid form; of a circular rotatry table having a surface disposed substantially in a horizontal plane; means for transferring adhesive from said supply to a portion of said surface of said table adjacent the outer boundary thereof; a first blade having an edge portion spaced from and extending across said surface of said table from a point in proximity with the outer boundary of said table inwardly thereof, said blade being disposed at such an angle to a radius of said table as to spread said adhesive inwardly across a substantial portion of said surface upon rotation of said table; a second blade having an edge portion mounted in spaced relation with said surface of said table, said edge portion and said surface defining a film-forming passageway of predetermined dimensions; means to rotate said table to carry the adhesive transferred thereto into contact with said first blade for spreading thereof and into contact with said second blade whereupon a portion at least of said adhesive will be carried through said film-forming passageway to form on a substantial portion of the surface of said table a film of adhesive of predetermined thickness, said second blade being disposed at such an angle to a radius of said table as to direct outwardly thereof any portion of said adhesive in excess of that which passes through said film-forming passageway; and means to remove such excess adhesive from said table.

8. In a machine of the class described the combination with a container in which is positioned a supply of adhesive in fluid form; of a rotary table having a surface disposed in a predetermined plane; means for forming upon said surface of said table a film of adhesive of predetermined thickness; means for intermittently rotating said table about an axis normal to said surface; means intermittently movable in timed relation with the rotation of said table for bringing a succession of objects individually to a position adjacent said table; and means for transferring definite patterns of said film of adhesive from said table individually to said objects comprising, a frame rotatable about an axis parallel to the axis of rotation of said table, a plurality of transfer heads carried by said frame and movable relatively thereto, means for intermittently rotating said frame in timed relation with the rotation of said table and the movement of said objects to bring said heads successively into a position to engage said film of adhesive and a position to engage an object, and means operable when said table, said frame and at least one of said objects are stationary to move one of said heads into engagement with said film of adhesive and another of said heads into engagement with said stationary object.

9. In a machine of the class described the combination with a container in which is positioned a supply of adhesive in fluid form; of a rotary table having a surface disposed in a predetermined plane; means for forming upon said surface of said table a film of adhesive of predetermined thickness; means for intermittently rotating said table about an axis normal to said surface; means intermittently movable in timed relation with the rotation of said table for bringing a succession of objects individually to a position adjacent said table; and means for transferring definite patterns of said film of adhesive from said table individually to said objects comprising, a frame rotatable about an axis parallel to the axis of rotation of said table, a plurality of transfer heads carried by said frame, means for intermittently rotating said frame in timed relation with the rotation of said table and the movement of said objects to position said heads successively to engage said film of adhesive and to engage an object, and means operable after an object has been brought to said position adjacent said table and when said table and said frame are not rotating to relatively move into engagement only in a direction parallel to the axis of rotation of said frame one of said heads and one of said objects and to relatively move into engagement only in a direction parallel to said axis of rotation of said frame another of said heads and said film of adhesive.

HOWARD G. ALLEN.
ELDEN R. KENISON.